United States Patent
Kano et al.

[11] Patent Number: 5,373,362
[45] Date of Patent: Dec. 13, 1994

[54] LIGHT SOURCE DEVICE FOR MEASURING SHAPE

[75] Inventors: Yukio Kano; Kuniyoshi Iwata, both of Aichi, Japan

[73] Assignee: Kabushiki Kaisha Tokai-Rika-Denki-Seisakusho, Aichi, Japan

[21] Appl. No.: 40,094

[22] Filed: Mar. 30, 1993

[30] Foreign Application Priority Data

Apr. 3, 1992 [JP]  Japan .................. 4-081842

[51] Int. Cl.⁵ ............................................. G01B 11/24
[52] U.S. Cl. ................................... 356/376; 356/372; 356/445; 362/440
[58] Field of Search ............. 356/376, 372, 445; 362/285, 372, 440

[56] References Cited

U.S. PATENT DOCUMENTS

| | | | |
|---|---|---|---|
| 4,875,777 | 10/1989 | Harding | 356/376 |
| 5,054,926 | 10/1991 | Dabbs et al. | 356/376 |
| 5,243,405 | 9/1993 | Tichenor et al. | 356/376 |

FOREIGN PATENT DOCUMENTS

| | | | |
|---|---|---|---|
| 50-36374 | 11/1975 | Japan | 356/376 |
| 56-138204 | 10/1981 | Japan | 356/376 |
| 57-22508 | 2/1982 | Japan | 356/376 |
| 58-52508 | 3/1983 | Japan | 356/376 |
| 62-299705 | 12/1987 | Japan | 356/376 |
| 1-308905 | 12/1989 | Japan | 356/376 |
| 2-300613 | 12/1990 | Japan | 356/376 |
| 4-74913 | 3/1992 | Japan | 356/376 |

*Primary Examiner*—Rolf Hille
*Assistant Examiner*—Minhloan Tran
*Attorney, Agent, or Firm*—Oliff & Berridge

[57] ABSTRACT

A light source device for measuring shape.

A laser beam emitted by a semiconductor laser is converged by a lens in a direction transverse to the laser junction. The laser beam emerging from the lens is diverged by a diverging means in the direction aligned with the laser junction, and passes through unchanged in the direction transverse to the laser junction.

16 Claims, 7 Drawing Sheets

LIGHT SOURCE DEVICE FOR MEASURING SHAPE

BACKGROUND OF THE INVENTION

1. Field of the Invention

This invention relates to a light source device for measuring shape, and in particular a light source device which measures the shape of a surface by irradiating the surface with a laser beam like slit shape and receiving the light reflected from the surface.

2. Description of the Related Art

A device is known in the art which measures the shape of surface undulations and other features without contact by a triangular quantization method (Japanese Patent Application Publication No. 50-36374, Japanese Patent Application Laid-Open No. 56-138204, Japanese Patent Application Laid-Open No. 57-22508 and Japanese Patent Application Laid-Open No. 58-52508).

In this shape measuring device, a slit type laser beam (referred to hereinafter as a slit beam) irradiates a surface to be measured, and light reflected from the surface irradiates on a sensor disposed at a predetermined angle with respect to the optical axis of the irradiating beam. Surface features are then measured by measuring the amount of reflected light reaching the sensor from the surface. More specifically, as shown in FIG. 3, the shape measuring device 12 comprises a semiconductor laser 50, a light source device 10 provided with a collimator lens 52 and a dispersing lens 54, a light receiving device provided with a light receiving lens 56 and photodetector 58, and a operating circuit 62 connected to the photodetector 58. The aforesaid dispersing lens 54 may consist of a rod lens or a cylindrical lens. The photodetector 58 may consist of CCD sensor or PSD element.

In the shape measuring device 12, light emitted by the semiconductor laser 50 is made to converge on a surface 60A to be measured by means of the collimator lens 52. The shape of the laser beam emerging from the collimator lens 52 is modified to that of a slit beam by the diffusing lens 54 before irradiating the surface 60A, The bright line is reflected at the surface 60A, collected by the receiving lens 56, and made to impinge on the photodetector 58. An image of the bright line in the surface 60A (referred to hereinafter as a slit image) is thereby formed on the photodetector 58, which outputs an electrical signal depending on the position of the slit image to the operating circuit 62.

As shown in FIG. 5, the aforesaid light source device 10 is provided with a lens barrel 30, the collimator lens 52 being fixed to the inside of this lens barrel 30. The diffusing lens 54 is fixed to the lens barrel 30 on the right-hand side of FIG. 5 by means of lens stoppers 34, and the semiconductor laser 50 fixed by a laser holder 32 is installed in the lens barrel 30 on the left-band side of FIG. 5. The outer circumference of the laser holder 32 and the inner circumference of the lens barrel 30 have screw surfaces. By rotating the laser holder 32 so as to screw it into the lens barrel 30, the distance between the semiconductor laser 50 and the collimator lens 52 is reduced. By adjusting the distance between the semiconductor laser 50 and the collimator lens 52 in this way, an adjustment can be made so as to cause the slit beam to converge on the surface 60A to be measured which is at a predetermined position.

The optical axis of the aforesaid light receiving device is fixed at a predetermined angle 0 with respect to the optical axis of the light source 10. When the shape of the step formed in the surface to be measured 60A in the optical axis direction of the light source 10, the positions of the light spot on the surface 60A are displaced in the optical axis direction of the source 10 depending on the shape of the step, and the light beam impinging on the photodetector 58 is modified as shown in FIG. 4A. If a two-dimensional CCD sensor is used as the photodetector 58, the signals output by the photodetector 58 from for example two arbitrary lines 59A, 59B in the horizontal plane of the paper in FIG. 4A are as shown in FIG. 4B and FIG. 4C. The two-dimensional CCD sensor outputs these signals to the operating circuit 62.

Based on these input signals, the operating circuit 62 computes the position of the slit image 64 as a whole on the photodetector 58 by computing the positions of points of intersection (light points) between all the lines and slit image 64 on the photodetector 58. The shifts of these intersection points are calculated in order to define the shape of the step on the surface 60A. The shape of an object to be measured 60 can then be determined by computing this shape of the step over the whole of the photodetector 58.

As shown by the following equation (1), the aforesaid light point positions can be computed by the weighted average of the signals output from arbitrary lines on the photodetector 58. In other words, if intersection points are specified from a slit image on arbitrary lines, an average is found by weighting with the light amount irradiating positions on the photodetector (FIG. 8A). From this relation, the position of a light point can be found even if the light point on the photodetector 58 has reached a predetermined size:

$$Za = \{\Sigma(Ii \cdot Zi)\}/\Sigma Ii \qquad (1)$$

where
i=0, 1, ...
Za=position of light point
Zi=position on photodetector
Ii=amount of light irradiating position This computation may also be performed by taking a simple average of positions irradiated on the photodetector by the laser beam at which the light intensity is above a preset threshold value Io. In other words, as shown in FIG. 8B, the intersection points Q1, Q2 where the output signal has the threshold intensity Io are computed, and positions Zb, Zc on the photodetector corresponding to the intersection points Q1, Q2 are then computed. A center value Zd of these computed positions Zb, Zc is defined as the light point position of the intersection between the slit image 64 and a line on the photodetector.

If a predetermined position on the photodetector 58 corresponding to a standard surface of the object to be measured 60 is first defined as a reference position, the displacement from the reference position of the surface to be measured 60A is expressed as a displacement of the image point on the photodetector 58. The displacement of the surface to be measured from the reference surface of the object 60 can then be computed by computing the shift of the computed slit image 64 with respect to the preset reference light point position based on the signal output according to the light image position on the photodetector 58.

However, it is known that the vertical/horizontal ratio of the light emitting part 50A of the semiconductor laser 50 is large. Depending on the direction of the light emitting part 50A when the semiconductor laser 50 is attached to the light source device, the width of the slit beam on the surface to be measured 60A is different as shown in FIGS. 7B and 7C. As the width direction of the slit beam is the measurement direction, if the width of the slit beam increases, the irradiation area required to specify the position of the surface to be measured increases. Due to the increase of irradiation area, the slit beam is more easily affected by such factors as surface roughness of the surface to be measured, and the sharpness of the light reflected by the surface 60A which irradiates the photodetector 58 decreases. As a result, the resolution required to detect the position decreases, and the position on the photodetector 58 corresponding to the value computed by the weighted average or simple average as described hereintofore, is displaced from the position of the real line so that a correct measured value cannot be obtained.

It is moreover known in the art that in the case of the semiconductor laser 50, the emergence (spread) angle of the laser beam is different in a direction aligned with the pn junction of the light emitting part 50A and in a direction traverse to the pn junction (FIG. 7A). For example, whereas the angle in the direction aligned with the junction of the semiconductor laser 50 is approximately 10°, the angle in the direction perpendicular to this junction is 30° to 40°. The divergence of the diffusing lens 52 therefore differs according to the direction of the light emitting part 50A when the semiconductor laser 50 is fitted to the light source device, and the light intensity near the edge of the slit beam irradiating the surface 60A varies. This relationship is shown in FIG. 6. In FIG. 6, Y corresponds to the position of the surface 60A, the intensity being a maximum at the optical center (0). If the light diverges in a direction aligned with the pn junction of the light emitting part 50A, therefore, the light intensity near the edge of the slit also falls, and the SN ratio of the output signal of the slit image corresponding to the edge of the slit beam irradiating the photodetector 58 decreases to a minimum.

Further, the output of the semiconductor laser 50 used in a conventional shape measuring device 12 is a low output of a few mW, and if it is desired to measure a surface 60A having a low reflectance, the amount of light received by the photodetector 58 falls. The SN ratio of the output signal from the photodetector 58 therefore deteriorates, and measurement errors occur. As the surface 60A of the object to be measured 60 will not necessarily have a high reflectance, a method was desired for measuring the surface shape of the object when its surface reflectance is low.

In order to measure the surface shape of the object 60 when the surface reflectance is low, a high power semiconductor laser 50 could possibly be used. In recent years, for example, as a result of technological advances, various semiconductor lasers having an output of 100 mW or more have been developed. Using these high power semiconductor lasers, the output signal from the photodetector 58 can be increased, and the surface shape of the object 60 having a low surface reflectance can be measured.

However, the vertical/horizontal ratio of the light emitting part is greater in the ease of a high power semiconductor laser than in the ease of a low power semiconductor laser. For example, the interval of the pn junction forming one side of the light emitting part is effectively the same, i.e. approximately 0.1 $\mu$m, but the length of the direction aligned with the pn junction forming the other side is approximately 50 $\mu$m in the ease of a high power semiconductor laser of 100 mW or more as compared to approximately 5 $\mu$m in the case of a low power semiconductor laser. When the power of the semiconductor laser 50 increases, therefore, the surface area of the light emitting part increases. Even if the same optical system is used in the high power laser as that of the conventional low power laser, and the laser is rotated to attach it to the lens barrel 30, the center value or weighted value computed by the weighted average or simple average as described hereinbefore is even further displaced from the real position computed with a low power laser when the width of the slit beam irradiating the surface to be measured 60A increases depending on the direction of the light emitting part 50A.

SUMMARY OF THE INVENTION

In view of the aforesaid facts, it is therefore an object of this invention to provide a shape measuring device for measuring the shape of a surface, wherein the surface is irradiated by a laser beam such that high resolution and an output signal with a high SN ratio is obtained irrespective of the reflectance of the surface to be measured.

In a first aspect of the invention, the shape measuring light source device comprises a semiconductor laser for emitting a laser beam, a lens for converging the laser beam in a direction transverse to the semiconductor laser junction, and a diverging means for diverging the laser beam emitted by the lens in a direction aligned with the laser junction while allowing it to pass through without modification in a direction transverse to the laser junction.

In a second aspect of the invention, the shape measuring light source device further comprises a displacing means, the lens and the diverging means forming a fixed optical system wherein either the fixed optical system or semiconduct or laser, or both, are displaced by the displacing means in the direction of the optical axis of the semiconductor laser while the divergence direction of the laser beam diverged by the diverging means and the direction aligned with the laser junction are maintained substantially parallel.

According to the first aspect of the invention, the shape measuring light source device is provided with a semiconductor laser which emits a laser beam. The laser beam emitted by the semiconductor laser irradiates on a lens, and this lens converges the incident laser beam in a direction transverse to the laser junction. The laser beam emerging from the lens irradiates the diverging means. The diverging means causes the laser beam emitted by the lens to diverge in a direction aligned with the laser junction, while allowing it to pass through without modification in a direction transverse to the laser junction. As the interval of the laser junction, i.e. the length of the light emitting part in the direction transverse to the junction, is less than its length in the direction aligned with the junction, the laser beam is converged by the lens in the direction transverse to the junction. In the direction aligned with the junction, the laser beam is caused to diverge by the diverging means, and the width of the slit beam obtained becomes narrower. Further, as the intervals of the junctions of a high power laser and low power laser are approximately the same, a slit beam of narrow width can be obtained with a high power laser as with a low power laser. Even if a high power laser having a large light emitting part is used, the width of the slit beam irradiating the surface to be measured does not increase. Therefore, even if the reflected light from the surface irradiated by the slit beam is detected by a photodetector which outputs a signal depending on position, the width of the slit beam, the SN ratio and the resolution do not decrease and no scatter is produced in the results.

According to the second aspect of the invention, the shape measuring light source device further comprises a displacing means, the lens and diverging means forming a fixed optical system wherein either the fixed optical system or semiconductor laser, or both, are displaced by the displacing means in the direction of the optical axis of the laser while the divergence direction of the laser beam diverged by the diverging means and the direction aligned with the laser junction are maintained substantially parallel. As the slit beam is brought to an image on the surface to be measured, the relation between the direction of the laser junction and the divergence direction of the diverging means does not change even if the positions of the diverging means and of the semiconductor are changed. There is therefore no change in the light intensity distribution of the slit beam irradiating the surface to be measured, which remains stable. Further, the width of the slit beam irradiating the surface, the SN ratio and the resolution do not decrease, and no scatter is produced in the results.

As described hereintofore, according to the present invention, even when a surface of low reflectance is being measured, the laser beam irradiates the surface so that the shape of the surface can be measured with a high SN ratio and high resolution.

DESCRIPTION OF THE PREFERRED EMBODIMENT

Figure 3:
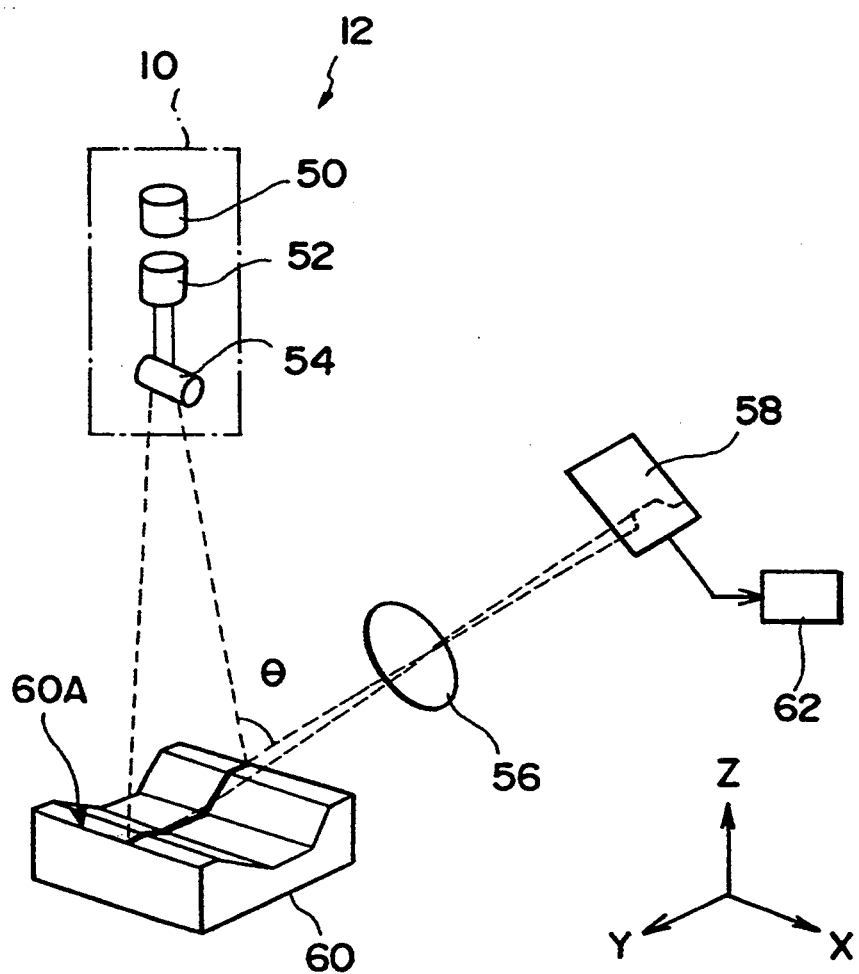
FIG. 3 is perspective view showing the overall layout of the shape measuring device.
Figure 4A:
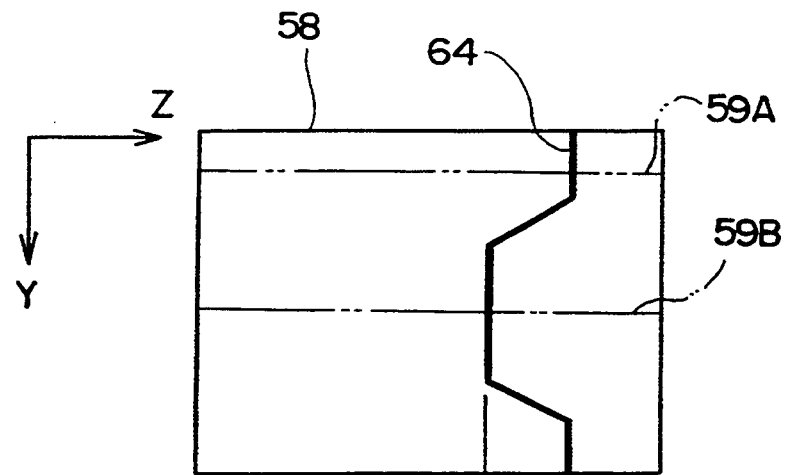
FIG. 4A is a line drawing showing an irradiation pattern of the laser beam on the photodetector (light receiving surface) of the shape measuring device.
Figure 4B:
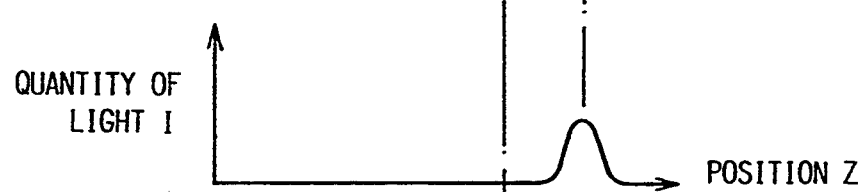
FIG. 4B is a line drawing showing one example of the output signal from the photodetector.
Figure 4C:
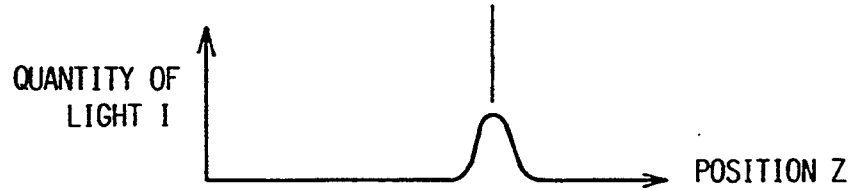
FIG. 4C is a line drawing showing another example of the output signal from the photodetector.
Figure 5:
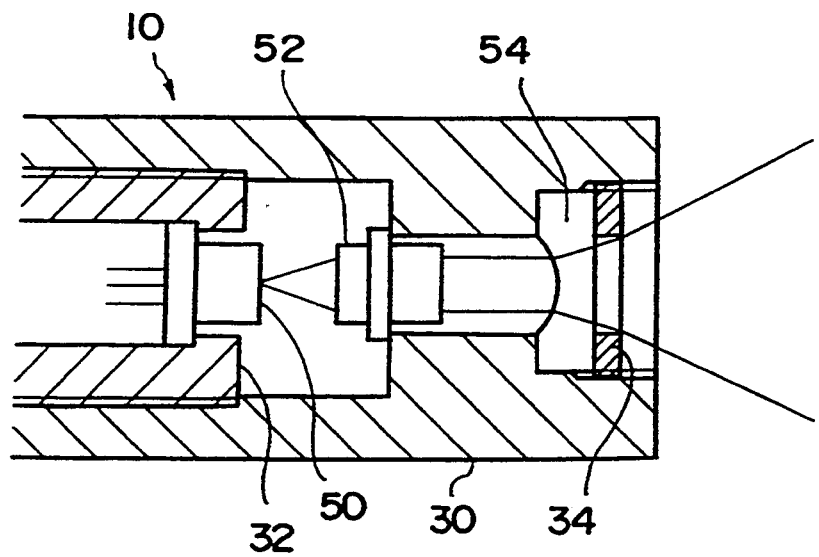
FIG. 5 is a sectional view showing the construction of the light source device in a conventional shape measuring device.
Figure 6:
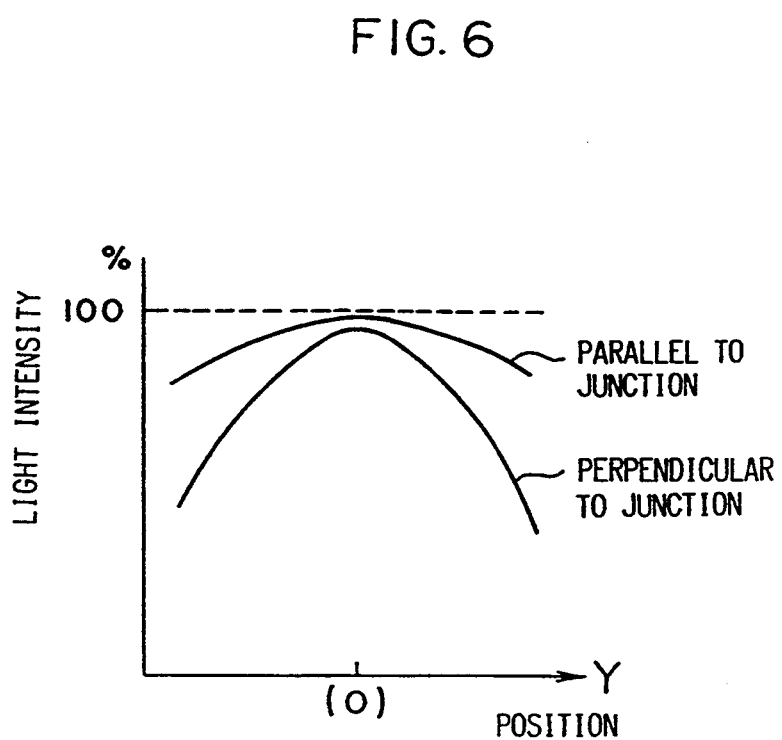
FIG. 6 is a line drawing showing the relation between the direction of the semiconductor laser and the light intensity distribution of the slit beam width irradiating a surface to be measured.

One embodiment of the invention will now be described in further detail with reference to the drawings. According to this embodiment, a laser beam is widened to a slit by a cylindrical lens 18 which acts as a diffusing means so as to irradiate the surface to be measured. The shape measuring device 12 used in this embodiment is substantially the same as that in the conventional example shown in FIG. 3, therefore similar parts will be identified by similar symbols and their detailed description will be omitted.

Figure 1A:
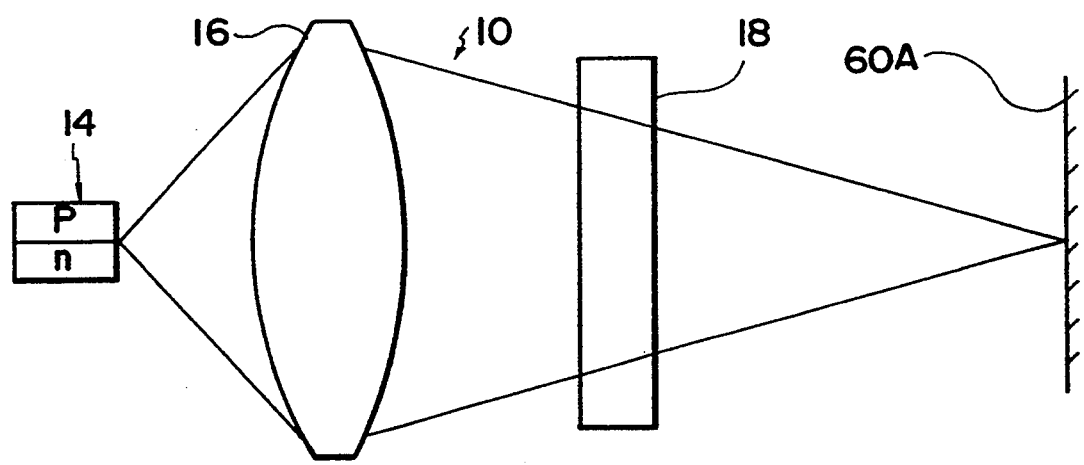
FIG. 1A is a lateral view of the light source device viewed from the direction aligned with the semiconductor laser junction in a shape measuring light source device according to one embodiment of the invention.
Figure 1B:
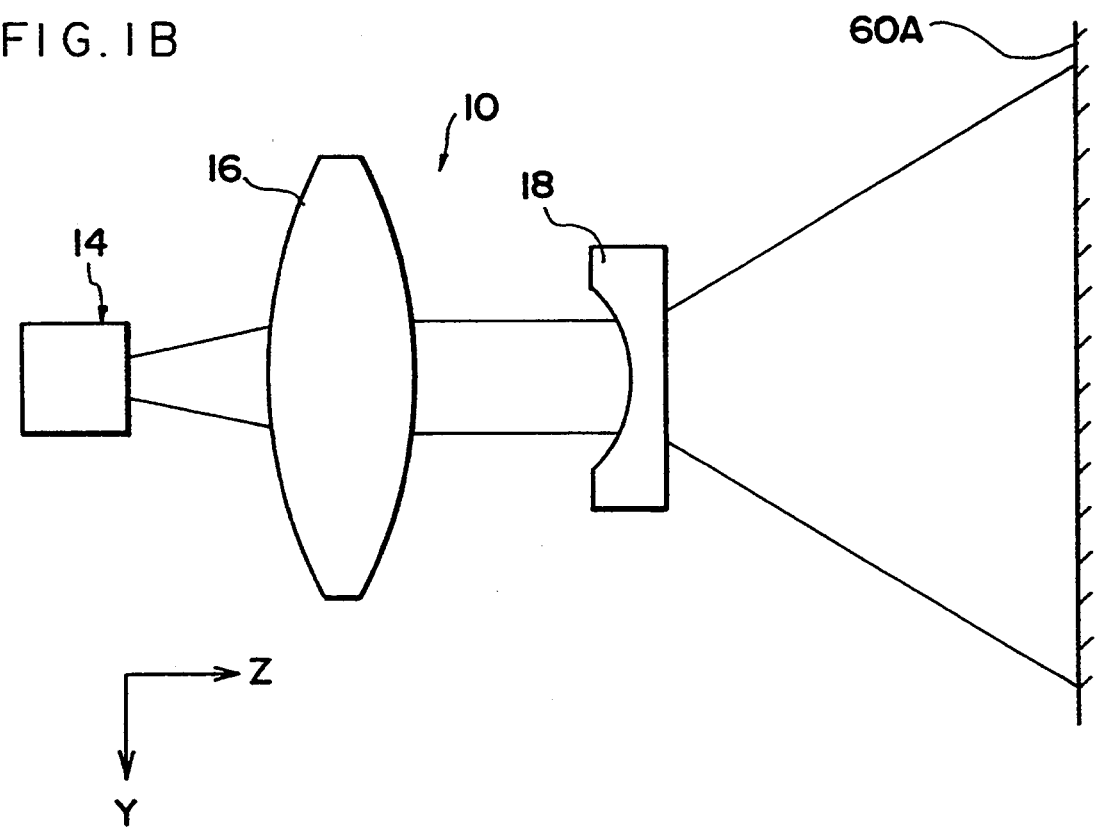
FIG. 1B is a a top plan view of FIG. 1A.

As shown in FIG. 1A and FIG. 1B, a light source device 10 comprising a high power semiconductor laser 14 is installed in the frame of the shape measuring device 12. This high power semiconductor laser 14 may be a semiconductor laser which has been converted to high power by a broad contact type optical amplifier or a multi-stripe laser diode array. A collimator lens 16 consisting of a spherical lens is disposed on the light emerging side of the semiconductor laser 14, the laser beam which emerges in a direction transverse to the laser junction being made to converge on the surface to be measured by this collimator lens 16 (FIG. 1A). As the laser beam which emerges in a direction aligned with the laser junction has a small emergence angle, it is converted to an essentially parallel beam by the collimator lens 16 (FIG. 1B). The cylindrical lens 18 is disposed on the light emerging side of the collimator lens 16, and a laser beam of small diameter emerging from the collimator lens 16 irradiates the cylindrical lens 18. The cylindrical lens 18 is of such a construction that cross-sections having identical concave parts form a continuous cylinder in the direction of the generating line, and is so arranged that the direction of this generating line coincides with the direction transverse to the junction of the semiconductor laser 14. The power of the cylindrical lens 18 is such that sufficient light intensity for measuring the surface 60A is maintained over the whole of the slit beam corresponding to the small divergence angle of the laser beam emerging in the direction aligned with the junction of the laser 14. The surface to be measured 60A is disposed on the light emerging side of the cylindrical lens 18, and the slit laser beam emitted by the cylindrical lens 18 is allowed to irradiate the surface 60A.

Figure 2:
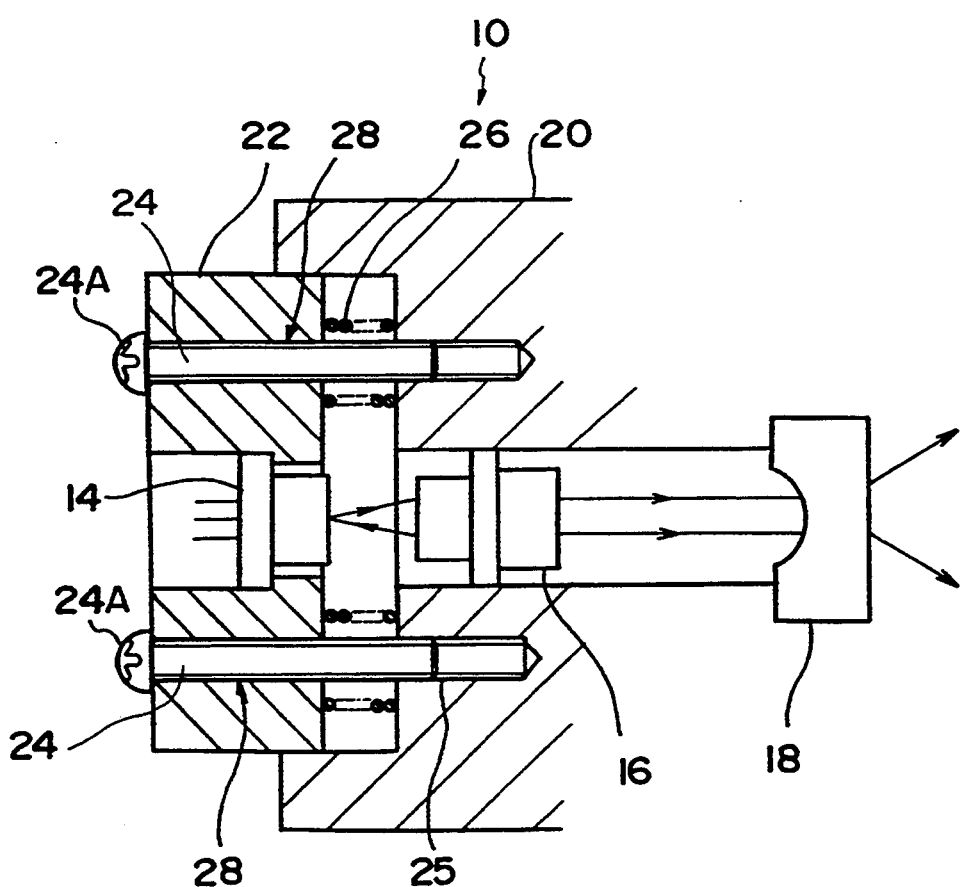
FIG. 2 is a sectional view showing the construction of the shape measuring light source device according to one embodiment of the invention.

As shown in FIG. 2, the semiconductor laser 14 is fixed to a laser holder 22, this laser holder 22 being installed such that it is free to move in the direction of the optical axis inside the lens barrel 20. It is desirable that the laser holder 22 can slide inside the lens barrel 20 so that the position of the light emitting part of the semiconductor laser 14 is not displaced in the direction transverse to the optical axis due to the displacement of the laser holder 22. The laser holder 22 is also provided with throughholes 28, screws 24 being passed through these throughholes 28. The screws 24 engage with screw holes 25 in the lens barrel 20 so as to fix the laser holder 22 to the lens barrel 20. A spring 26 is provided between the lens barrel 20 and the laser holder 22, the laser holder 22 being kept in contact with the head portion 24A of a screw by urging force of the spring 26. When the screw 24 is tightened or loosened, therefore, the semiconductor laser 14 moves in the direction of the optical axis, and the focus can be adjusted without rotating the direction of the junction of the laser 14.

The slit beam which is made to diverge into a slit by the cylindrical lens 18 irradiates the surface to be measured 60A, and the intersection of the slit beam and the surface to be measured is illuminated. The slit beam irradiating the surface 60A is reflected by the surface 60A, and an image corresponding to the shape of the surface 60A passes through the receiving lens 56 so as to form an image on the photodetector 58.

This photodetector 58 outputs an electrical signal to the operating circuit 62 depending on the position and intensity of the laser beam irradiating a CCD sensor consisting of a two-dimensional array of CCD elements.

The function of this embodiment will now be described.

When the laser beam emerges from the semiconductor laser 14, it irradiates the surface to be measured 60A via the collimator lens 16 and the cylindrical lens 18. Of the laser beams incident on the collimator lens 16, the beam in the direction transverse to the laser junction is made to converge on the surface 60A by the collimator lens 16 (FIG. 1A), and the beam in the direction aligned with the junction is made to diverge into a slit by the collimator lens 16 and the cylindrical lens 18 (FIG. 1B). The slit shaped laser beam aligned in the direction of the junction of the laser 14 therefore irradiates the surface 60A. The reflected light from the laser beam (slit beam) irradiating the surface 60A is then collected by the receiving lens 56, and irradiates the photodetector 58.

The reflected light from the surface 60A irradiates the photodetector 58 via the receiving lens 56, and the photodetector 58 outputs a signal to the operating circuit 62 depending on the position and intensity of the beam irradiating the photodetector. The operating circuit 62 computes a value (center value) corresponding to the position of the slit image 64 by computing a weighted average based on the input signal, or computes a value (average value) corresponding to the position of the slit image 64 by computing a simple average based on the input signal, and thereby computes the position of the slit image on the photodetector 58. The circuit 62 also determines the steps on the surface to be measured by finding the deviations of the slit image so computed. The shape measuring device 12 of this embodiment therefore computes steps on the surface 60A by means of the operating circuit 62 based on the output signals from the photodetector 58.

As the laser beam is made to diverge in the direction aligned with the junction of the semiconductor laser 14 as described hereintofore, there is no divergence in the direction perpendicular to the junction of the laser 14 and a narrow slit beam is obtained in this direction. There is therefore no decrease of resolution for detecting position, a slit image is formed by a narrow slit beam on the photodetector 58, and a highly sensitive signal is output by the photodetector 58. The position on the photodetector 58 corresponding to the position of the slit beam computed by a weighted average or simple average as described hereintofore, is thus computed correctly according to its real position, and an optimum shape of the object to be measured is obtained.

Further, the semiconductor laser 14 can move in the direction of the optical axis inside the lens barrel 20 while the direction of the junction of the laser 14 and the length direction of the slit beam still coincide. Even if the distance between the laser 14 and the collimator lens 16 is changed so as to perform a focal adjustment on the slit beam irradiating the surface to be measured 60A, the laser beam is made to diverge in the direction perpendicular to the junction of the laser 14 by rotating the laser. Consequently, the slit beam does not widen, and the surface 60A can be irradiated by a narrow slit beam. Even if a focal adjustment is performed on the slit beam, the photodetector 58 outputs a highly sensitive signal, and the position of the slit beam can be found correctly corresponding to its real position.

Figure 7A:
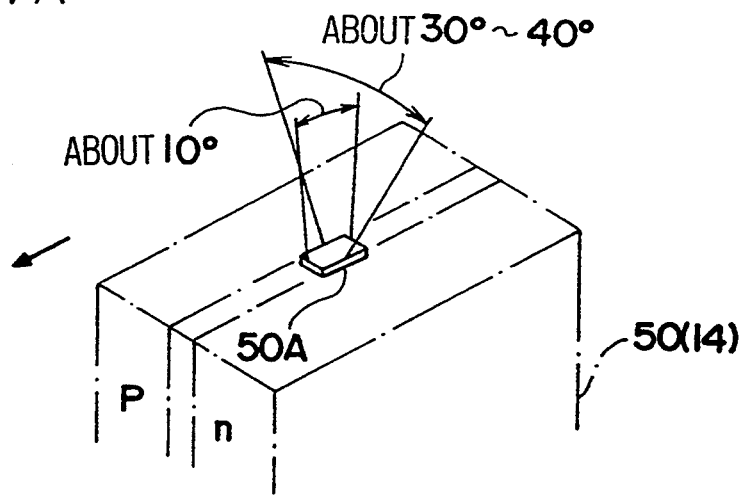
FIG. 7A is a perspective view showing the light emitting part of the semiconductor laser.
Figure 7B:
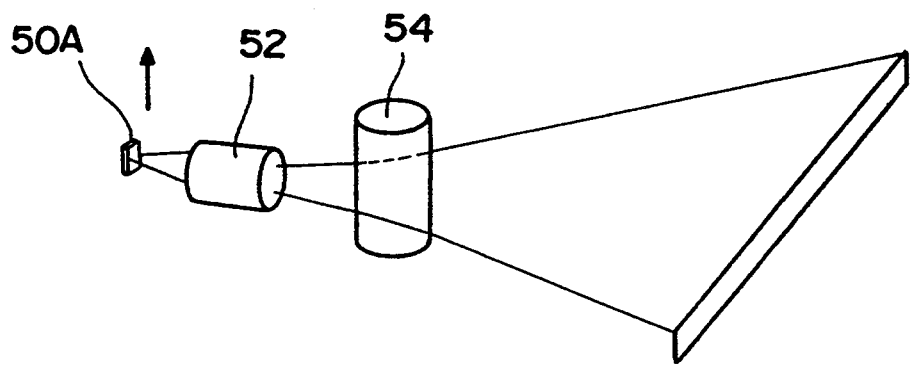
FIG. 7B is a line drawing showing the relation between the direction of the semiconductor laser and the slit beam width irradiating the surface to be measured.
Figure 7C:
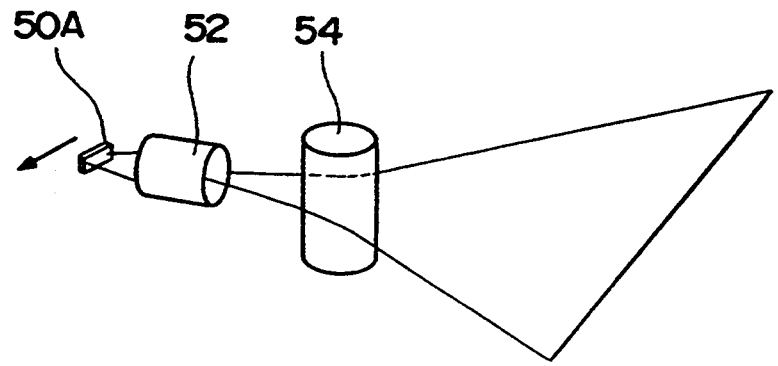
FIG. 7C is a line drawing showing the relation between the direction of the semiconductor laser and the slit beam width irradiating the surface to be measured.
Figure 8A:
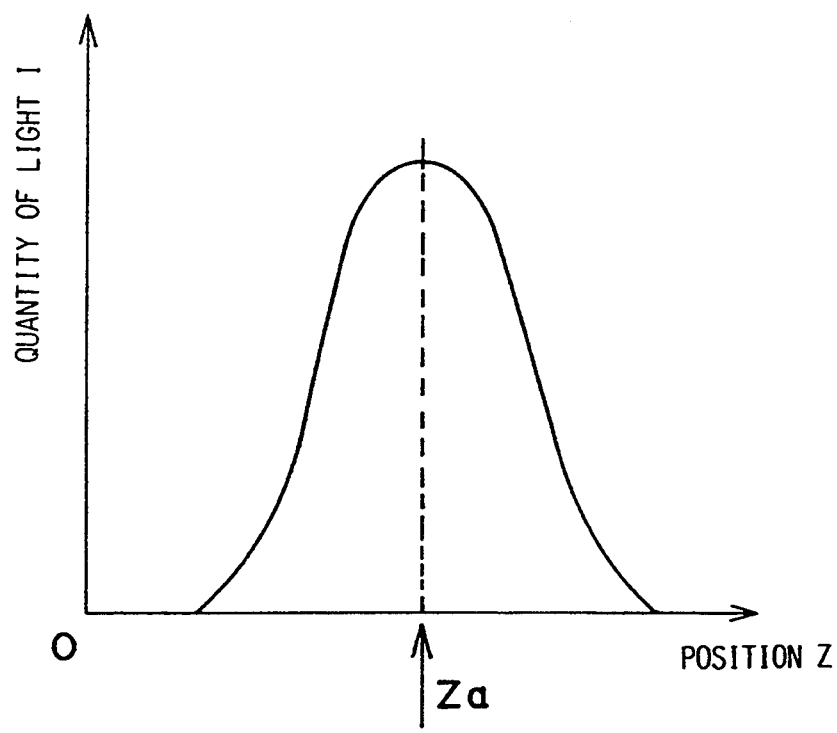
FIG. 8A is a line drawing showing the relation between positions on arbitrary lines on the photodetector and the irradiating light amount.
Figure 8B:
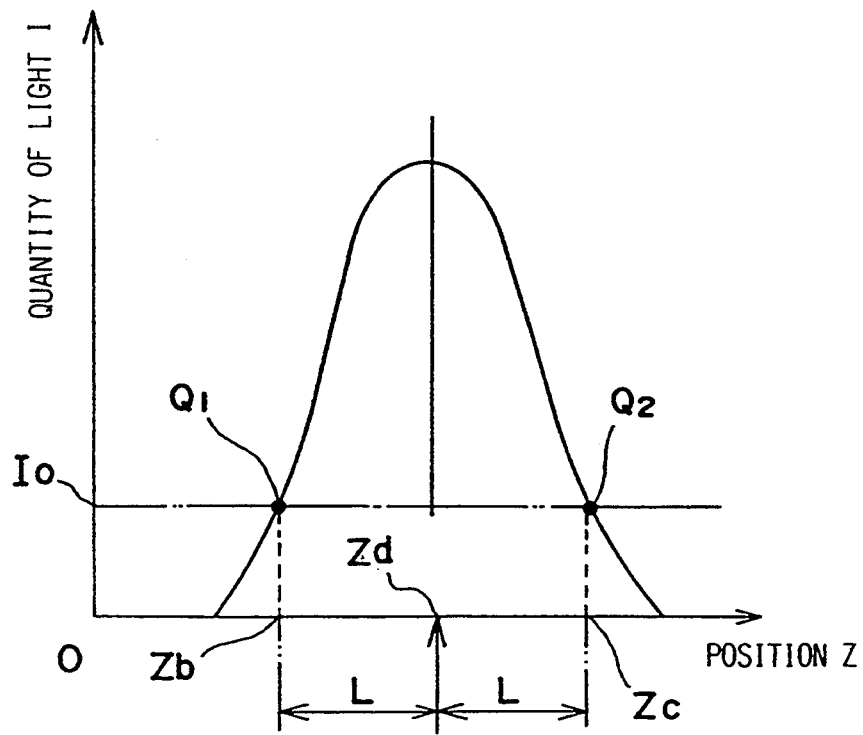
FIG. 8B is a line drawing showing the relation between positions on arbitrary lines on the photodetector and the irradiating light amount.

The divergence angle of the laser beam emitted by the laser 14 is different according to the direction of the laser 14 (FIG. 7A), but according to this embodiment, the lens power of the cylindrical lens 18 is at a strength necessary to maintain sufficient light intensity for measuring the surface 60A over the whole of the slit beam corresponding to the divergence angle in the direction of the junction of the laser 14. The surface 60A is therefore irradiated by a laser beam having a stable light intensity distribution over the whole of the slit beam, and there is no deterioration of the SN ratio of the output signal from the slit image in the vicinity of the edges irradiating the photodetector 58.

As described hereintofore, according to this embodiment, there is no widening of the line width of the slit beam, no change of light intensity depending on the position of the beam irradiating the surface 60A, and a suitable slit beam can be made to irradiate the surface 60A. The photodetector therefore outputs a highly sensitive signal, and even if the surface to be measured has a low surface reflectance, the shape of the surface taking account of distances and differences in level can be measured with high resolution and a good SN ratio.

In this embodiment, an example has been described wherein a slit beam was obtained using a cylindrical lens 18. However, the slit beam may also be obtained by means of a rod lens or a cylindrical mirror, and a slit beam may moreover be obtained by scanning a rotating multi-surface mirror or the like with the laser beam.

Further, in this embodiment, a case has been described wherein the photodetector is a two-dimensional CCD sensor. The photodetector is however not limited to a two-dimensional CCD sensor, and any device capable of outputting a two-dimensional position on a sensor using a position detecting method with an image pickup tube television system may also be employed.

What is claimed is:

1. A light source device for measuring shape comprising:
   a semiconductor laser emitting a laser beam;
   a lens for converging said laser beam in the direction transverse to a junction of said semiconductor laser;
   diverging means for making the laser beam emitted by said lens diverge in a direction aligned with the junction of said laser while allowing the beam to pass through without modification in the direction transverse to the junction of said laser; and
   displacing means, wherein said lens and said diverging means are fixed in a fixed optical system, for displacing at least one of said fixed optical system and said semiconductor laser in the optical axis direction of said semiconductor laser while a divergence direction of the laser beam made to diverge by said diverging means and the direction aligned with the junction of said semiconductor laser are maintained substantially parallel, wherein said displacing means comprises a semiconductor laser holder, said semiconductor laser is fixed at a predetermined position of said semiconductor laser holder, and said semiconductor laser holder can be displaced in said optical axis direction together with said semiconductor laser.

2. A light source device for measuring shape as claimed in claim 1, wherein said displacing means comprises a fixed optical system holder, said fixed optical system is fixed at a predetermined position of said fixed optical system holder, and said fixed optical system holder can be displaced in said optical axis direction together with said fixed optical system.

3. A light source device for measuring shape as claimed in claim 2, wherein said displacing means comprises guide means, said guide means is passed through one of said semiconductor laser holder and said fixed optical system holder, said guide means is installed such that one of ends of said guide means engages with one of said semiconductor laser holder and said fixed optical system holder, and the guide means screws into the other holder and at least one of said semiconductor laser holder and said fixed optical system holder is guided in the direction of said optical axis by screwing in and screwing out of said guide means.

4. A light source device for measuring shape as claimed in claim 3, wherein said displacing means comprises urging means, said urging means is installed between said semiconductor laser holder and said fixed optical system holder, said urging means provides a urging force so as to separate said semiconductor laser holder and said fixed optical system holder in the direction of the optical axis, and so as to keep said one of said guide means continuously engaged with one of said semiconductor laser holder and said fixed optical system holder.

5. A light source device for measuring shape as claimed in claim 4, wherein said urging means is a spring.

6. A light source device for measuring shape as claimed in claim 3, wherein said guide means comprises of a plurality of screws.

7. A light source device for measuring shape as claimed in claim 1, wherein said lens is a collimator lens.

8. A light source device for measuring shape as claimed in claim 1, wherein said diverging means is at least one of a rod lens and a cylindrical lens.

9. A light source device for measuring shape as claimed in claim 1, wherein said semiconductor laser is one of a broad contact type laser and a multi-stripe type laser.

10. A light source device for measuring shape comprising:
    a semiconductor laser emitting a laser beam;
    a collimator lens for converging said laser beam in the direction transverse to junction of said semiconductor laser;
    diverging means which makes the laser beam emitted by said collimator lens diverge in a direction aligned with the junction of said laser while allowing the beam to pass through without modification in the direction transverse to the junction of said laser; and
    displacing means, wherein said collimator lens and said diverging means are fixed in a fixed optical system, for displacing at least one of said fixed optical system and said semiconductor laser in the direction of the optical axis of said laser while divergence direction of the laser beam made to diverge by said diverging means and the direction aligned with the junction of said laser are maintained substantially parallel,
    wherein said displacing means comprises a semiconductor laser holder, said semiconductor laser holder fixes said semiconductor laser at a predetermined position of said semiconductor laser holder, and said semiconductor laser holder can move together with said semiconductor laser in said optical axis direction.

11. A light source device for measuring shape as claimed in claim 10, wherein said displacing means comprises a fixed optical system holder, said fixed optical system holder fixes said fixed optical system at a predetermined position of said fixed optical system holder, and said fixed optical system holder can move together with said fixed optical system in said optical axis direction, said fixed optical system holder also having a concave portion cut out from one end of said fixed optical system holder in said optical axis direction such that said semiconductor laser holder can move in said optical axis direction inside said concave portion.

12. A light source device for measuring shape as claimed in claim 11, wherein said displacing means comprises a plurality of headed screws, said headed screws pass through said semiconductor laser holder, heads of said plurality of headed screws engage with said semiconductor laser holder, and said plurality of headed screws which have passed through said semiconductor laser holder screw into said fixed optical system holder, said semiconductor laser holder being guided in the optical axis direction by the rotation of said plurality of headed screws.

13. A light source device for measuring shape as claimed in claim 12, wherein said displacing means comprises a plurality of compressive coiled springs corresponding to the number of headed screws, said plurality of compressive coiled springs being installed between said semiconductor laser holder and said fixed optical system holder coaxially with said plurality of corresponding headed screws, said plurality of compressive coiled springs exerting a urging force tending to separate said laser holder and said fixed optical system holder in the optical axis direction, and keep the heads of said plurality of headed screws continuously engaged with said laser holder.

14. A light source device for measuring shape as claimed in claim 12, wherein said plurality of headed screws are provided in a pair, said pair of headed screws being disposed such that said optical axis is interposed between respective headed screws of said pair of headed screws.

15. A light source device for measuring shape as claimed in claim 10, wherein said diverging means is at least one of a rod lens and a cylindrical lens.

16. A light source device for measuring shape as claimed in claim 10, wherein said semiconductor laser is one of a broad contact type laser and a multi-stripe type laser.

* * * * *